No. 759,885. PATENTED MAY 17, 1904.
J. Q. A. HAUGHEY.
INHALER.
APPLICATION FILED SEPT. 14, 1903.

NO MODEL.

Witnesses.
John A. Wilson.
A. W. Wilcox

Inventor.
J. Q. A. Haughey.
by Edward N. Pagelsen.
his Attorney.

No. 759,885.

Patented May 17, 1904.

UNITED STATES PATENT OFFICE.

JOHN Q. A. HAUGHEY, OF BATTLECREEK, MICHIGAN.

INHALER.

SPECIFICATION forming part of Letters Patent No. 759,885, dated May 17, 1904.

Application filed September 14, 1903. Serial No. 173,059. (No model.)

*To all whom it may concern:*

Be it known that I, JOHN Q. A. HAUGHEY, a citizen of the United States, residing at Battlecreek, in the county of Calhoun and State of Michigan, have invented a new and Improved Inhaler, of which the following is a specification.

My invention relates to medicine-inhalers; and the objects of my improvements are to provide an instrument in which the air will pass over cotton or other absorbent material, and so become saturated with the vapors of the medicine it is desired to inhale, to provide an instrument that can easily be cleaned, and to provide an instrument that can be made and sold at a low price. I attain these results by the construction illustrated in the accompanying drawings, in which—

Figure 1:
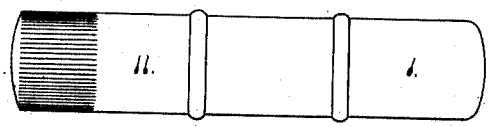
Figure 2:
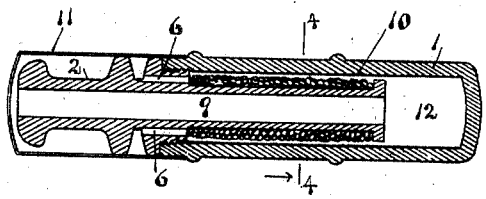
Figure 3:
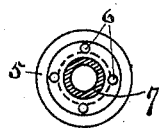
Figure 4:
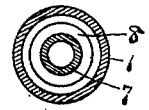
Figure 5:
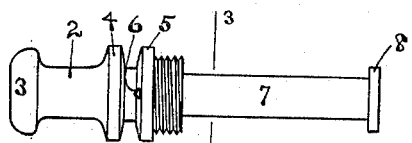

Figure 1 is a view of the inhaler with the cap over the mouthpiece. Fig. 2 is a longitudinal section. Fig. 3 is a cross-section on the line 3 3 of Fig. 5. Fig. 4 is a cross-section on the line 4 4 of Fig. 2, and Fig. 5 is a view of the mouthpiece.

Similar reference characters refer to like parts throughout the several views.

The case 1 of the inhaler is screw-threaded to receive the mouthpiece 2, which is provided with the end knob 3, the middle collar 4, the threaded collar 5, having passages 6, and the stem 7, having the end shoulder 8. The bore 9 extends through the mouthpiece and the stem. Around the stem 7 is wrapped the absorbent material 10, which may be absorbent cotton or any other desirable substance. As it is easily removed and replaced, one medicine can easily be substituted for another. The cap 11, which is roughened at its outer end, protects the mouthpiece when the inhaler is not in use and also prevents evaporation of the medicine.

When the inhaler is used, the air passes in through passages 6, over the absorbent material 10, into the chamber 12, and thence through bore 9 to the mouth. The collar 4 prevents the lips from closing the passages 6.

Having now explained my improvement, what I claim as my invention, and desire to secure by Letters Patent, is—

1. In an inhaler, the combination of a casing open at one end, a mouthpiece fitting into said open end, a stem attached to said mouthpiece to support absorbent material, said mouthpiece and stem having a central bore to permit the air in the casing to be withdrawn, and said mouthpiece having passages to supply air to said casing, substantially as described.

2. In an inhaler, the combination of a cylindrical casing closed at one end, a mouthpiece having a screw-threaded collar to fit the open end of the casing, a stem attached to said mouthpiece to support absorbent material and having a shoulder on its outer end, said mouthpiece and stem having a central bore to permit air to be withdrawn from the casing, said threaded collar having passages to supply air to the casing, and said mouthpiece having a collar to prevent the passages being closed while the inhaler is used, substantially as described.

In testimony whereof I have signed my name to this specification in the presence of two subscribing witnesses.

JOHN Q. A. HAUGHEY.

Witnesses:
G. W. MORSE,
JAMES A. WELLS.